W. H. BOOKER.
PRIVY.
APPLICATION FILED JAN. 3, 1918.
1,290,886.
Patented Jan. 14, 1919.
2 SHEETS—SHEET 2.
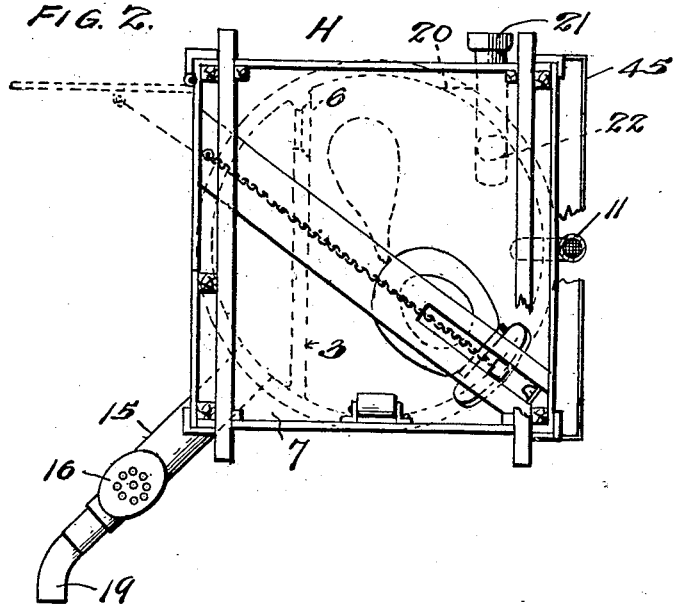
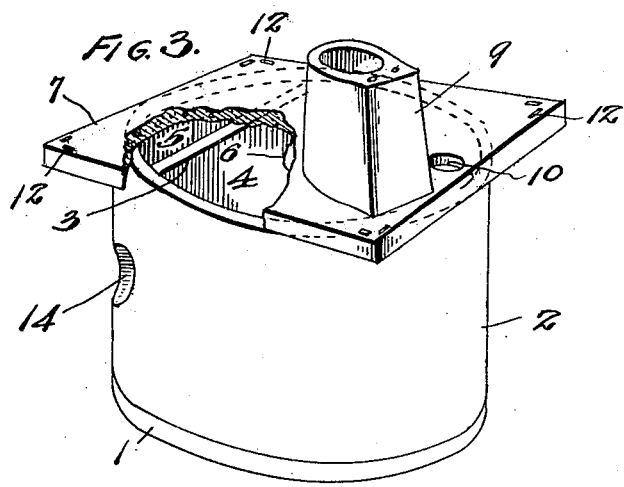
Inventor
Warren H. Booker
By Henry Orth
Attorney

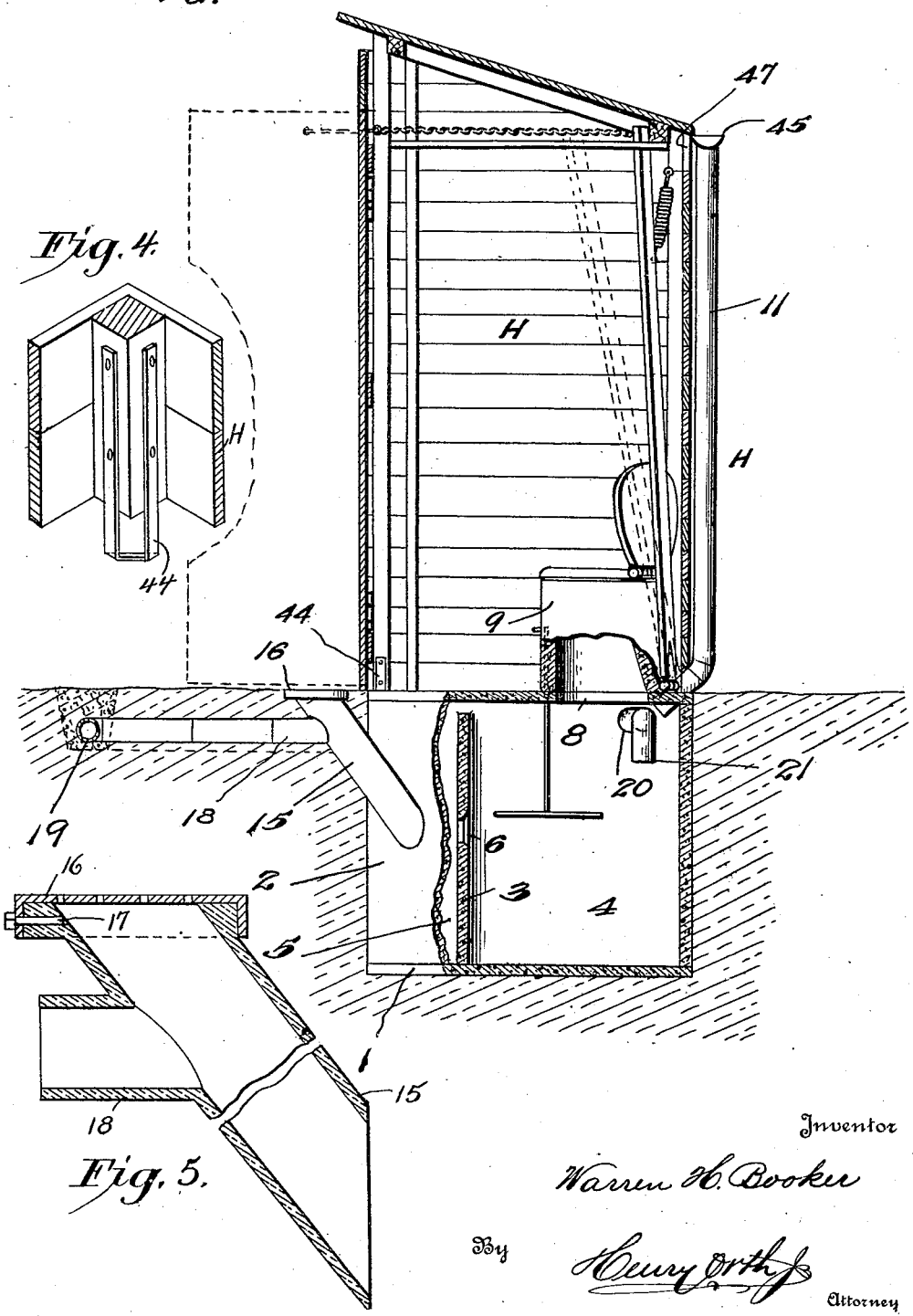

UNITED STATES PATENT OFFICE.

WARREN H. BOOKER, OF RALEIGH, NORTH CAROLINA.

PRIVY.

1,290,886.	Specification of Letters Patent.	Patented Jan. 14, 1919.

Application filed January 3, 1918. Serial No. 210,147.

*To all whom it may concern:*

Be it known that I, WARREN H. BOOKER, a citizen of the United States, and a resident of Raleigh, Wake county, North Carolina, have invented certain new and useful Improvements in Privies; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a structure for the sanitary treatment and disposal of sewage matter, for use as a sanitary privy, as well as for the treatment of house sewage, such as is ordinarily discharged from residences and other buildings into ordinary sewers.

The object of this device is to provide a simple compact and inexpensive device to be used as a sanitary privy, which will safely, surely and satisfactorily dispose of all such materials as are ordinarily deposited in privies, privy vaults, excreta vaults, latrines, cess-pools, and similar places in a sanitary manner, by means of septic, settling, bacterial or chemical action, as well as of other wastes when delivered in a more or less liquid condition, such as ordinary house sewage or domestic sewage.

A further object of this invention is to provide a structure which may be used for a sanitary privy, a domestic sewage disposal plant, or a combination privy and sewage disposal plant.

Referring to the drawings, in which like parts are similarly designated,—

Figure 1 is a vertical section, with parts in elevation, of the entire structure, and also a cross-section of nitrification bed.

Fig. 2 is a plan thereof.

Fig. 3 is a perspective view of the preferred form of tank and commode.

Fig. 4 is a detail of the corner anchor irons to fasten the corners of the privy house securely to the top slab that serves as the tank cover and the privy floor.

Fig. 5 is a side view of the overflow and ventilating pipe from the settling tank.

Placed or made in the bottom of a suitable excavation in the ground, is a slab 1, preferably circular, on which is set in cement a cylinder or tank body 2, preferably made of cement, and within this tank body is set in cement a partition that divides the tank into two chambers, 4 and 5, of unequal size. These chambers communicate with one another through a hole 6, preferably, but not necessarily, tapered from the larger chamber 4 to the smaller chamber 5. This hole 6 is near one end edge of the partition 3, about midway of its height, or at the level of the greatest liquefaction in chamber 4, *i. e.*, between sludge level and scum level.

The tank is covered by a concrete slab 7, preferably, but not necessarily, square. This slab has a large hole 8 over which the commode 9, of cement, porcelain, or equivalent material is placed; and a smaller hole 10 for the reception of the end of the drain pipe 11, to be cemented therein; also a pair of perforations or slots 12 at right angles to each other, at each corner of the slab, and a small perforation 13 near the commode opening.

The tank 2 has an opening 14 about midway of its height into which is cemented the overflow exit pipe 15 taking the effluent from the smaller chamber 5 at a point as far from the partition opening 6 as is practicable. This pipe extends to the surface of the ground where there is provided a removable, perforated cap 16 held in place against accidental removal by a pin and hole connection 17, or otherwise, and below this cap is a branch 18 to which is connected the farm tile drain 19 of the nitrification bed.

The tank 2 is also provided with a hole 20 fitted with a removable plug. A pipe 21 having a downwardly bent end and extending below the surface of the scum in the chamber 4, may be cemented in this hole. The house drainage system is connected with this pipe when desirable or necessary. The pipe has an opening 22 in its top at the bend, acting as a vent and clean-out in case of stoppage.

Passing up through the aforementioned corner perforations 12 in the slab 7 are the flat ends of strap iron yokes 44. These ends are at an angle of 90° to one another, and each end is secured to a face of the corner posts for the house, and holds the house in place.

When inspection of the tank is desired, the house may be tilted, and these yokes hold the slab to the house during the opening of the tank, so that the house acts as a lever for tilting the slab. The slab also acts as an anchor for the house.

In order to secure proper bacterial action and operation it is recognized by sanitary engineers that about five to ten gallons of water per week should be added to the tank for an ordinary family, in order to obtain good action.

In order to automatically supply the proper amount of water, the size of the roof of the privy house is proportioned to the annual rain fall, so that the roof will deliver to the tank the required amount of water. To accomplish this, the roof should slope to the rear and deliver the rain water to a gutter 45 which discharges into the pipe 11, which acts both as a vent pipe and a rain spout. This pipe 11 is provided with a fly screen 46.

To provide sufficient light and ventilation of the house H it is left open near the top a few inches, as indicated at 47, just below the roof.

The general principle of liquefaction by anaerobic bacterial action is well known, and to obtain this action in the most efficient manner I locate the commode 9 as far as practicable from the opening 6, connecting the two chambers 4 and 5, in order to give ample time during the passage from one compartment to the other for gasification and liquefaction. Another object of locating the hole 6 near the edge of the tank is to maintain as thorough circulation in the larger compartment 4 as is possible, without carrying over into the smaller compartment any material quantity of undissolved solids. Some will very likely go over, but most of what does go over will be acted upon in the second compartment.

The overflow from the smaller compartment 5 is through pipe 15, which connects with the tank 2 at a point as distant from the connecting opening 6 between the two compartments as is practicable.

This overflow pipe 15 is straight and vented through the top 16, so as to admit of ready clearing when the top is removed, should the pipe be accidentally clogged. The vent allows the entrance of air to the drain tile 19 of the nitrification bed, thereby encouraging or facilitating anaerobic bacterial action for conversion of the soluble organic matter into stable nitrites and nitrates, by which action pathogenic bacteria are effectually destroyed.

The open-jointed tile 19 of the nitrification bed are laid in a shallow trench in porous material, as coarse sand, cinder, gravel, or crushed stone, with the object of supplying the greatest amount of aeration possible to the liquid effluent.

Experience with a structure such as described has shown that there is no so-called "short-circuiting" whereby undissolved matter is carried over into the nitrification bed. Also that there are no so-called "dead corners", or places where there is no circulation, and in which the material becomes septicized or "stale", in which case it is difficult to secure subsequent bacterial action.

The tank is preferably cylindrical, as this form has been found to be the most effective.

When the size of the plant is to be increased, two or more cylinders 2, with baffle walls, may be superimposed.

A great advantage of this structure is that I am enabled to dispense with all pipes, siphons, traps, and the like between the compartments 4 and 5, as well as from compartment 5.

Experience shows that the opening 6 does not clog, and that less sludge is carried over from the large anaerobic compartment 4 into the small compartment 5 than when pipes and the like are used.

The opening 6 it will be noted is unobstructed, and large enough to allow a large volume of liquid to pass from one chamber to another so as to produce no disturbing or sludge diverting current from chamber 4 into chamber 5 that will divert lumps of sludge from their normal rising and falling path into the chamber 5. This is facilitated by the vertical arrangement of the hole 6 parallel to the normal rising and falling path of the sludge during the anaerobic action, and by beveling the edge of the opening so that there are no edges to catch the sludge as it moves past the opening, and on which sludge might hang.

This opening has no strainer, and it does not have a straining action, as it is above the sludge line and below the scum line. It requires no cleaning as it does not clog, and I thus do away with the most objectionable feature of septic tanks, namely the periodical cleaning of the strainers and siphon pipes.

The house drainage connection 21, before being cemented in place, may be turned 90° from the position shown, as the hole 20 is oval and its two ends are conical with a 45° base angle.

I claim—

1. The combination with a septic tank, of a partition wall therein dividing the tank into an anaerobic fermentation compartment and a second compartment, said partition wall having an unobstructed opening therethrough between the top and bottom thereof at about the level of the maximum liquefaction in the tank, said opening being non-straining and producing no sludge diverting current between the compartments.

2. The combination with a cylindrical septic tank, of a partition dividing the tank into two unequal compartments and having a flared opening near one side edge leading from the larger to the smaller compartment at the level of greatest liquefaction, a commode discharging into the larger compartment near the side of the tank adjacent the opposite side edge of said partition, and a straight vented overflow pipe inclined to the side of the tank and leaving the smaller chamber adjacent said edge of said partition.

3. The combination with a septic tank; of a partition wall dividing the tank into two unequal compartments and having an opening near one side edge between the top and bottom thereof and a straight inclined overflow pipe connected to the smaller compartment adjacent the edge of the partition opposite said opening, said pipe having a vented upper end and a branch from said pipe receiving the overflow from said compartment for delivery to a nitrification bed.

4. The combination with a septic tank; of a removable concrete slab cover therefor and a privy house detachably connected to said cover, said house operating as a lever to tilt said slab when removal is required.

5. The combination with a septic tank, of a privy house, a removable concrete slab having a pair of slots therethrough at each corner of said house, and yokes whose legs pass up through pairs of said slots and are attached to the rectangular faces of the posts of said house.

6. The combination with a septic tank, a privy house thereover, means to conduct rain water from the roof of said house to said tank, said roof proportioned to the annual rain fall to supply the quantity of water required for proper septic action.

7. The combination with a septic tank having a partition wall dividing the tank into two compartments, said wall having a non-straining opening between the top and bottom thereof, and a straight, upwardly and outwardly inclined overflow pipe connected to one of the compartments and having a branch for connection with a nitrification bed.

8. The combination with a septic tank, of means to collect and deliver water thereto, said means also operating as a vent for gases arising in said tank.

9. The combination with a septic tank, of means proportioned to rain fall to automatically deliver the quantity of water required for fermentation, said means also operating as a vent to discharge the gases from said tank to the atmosphere.

10. The combination with a septic tank, of a vertical partition wall dividing the tank into two compartments and having an unobstructed non-straining and non-current producing opening therethrough between its top and bottom connecting said compartments, said opening being free from pipes and siphons, whereby sludge will be free to rise and fall without obstructing said opening.

11. The combination with a septic tank, of an overflow pipe inclined upwardly and outwardly to the wall of said tank whose end is approximately flush with the inner surface of the tank between the top and bottom thereof, whereby the rising and falling of sludge material will slide past the end of said pipe along the tank wall without obstructing the end of said pipe.

12. The combination with a septic tank, of a straight, upwardly and outwardly inclined overflow pipe having an unobstructed end opening into the side of the tank substantially flush with the inner wall of the tank between the scum and sludge line, whereby the rising and falling sludge material will slide past the end of said pipe along the tank wall without obstructing the ends of said pipe.

13. The combination with a septic tank; of a vent pipe connected thereto, a privy house over said tank and means to collect privy house roof water and deliver it through said vent pipe to said tank.

14. The combination with a septic tank; of a substantially vertical partition wall therein having an unobstructed opening therethrough at one of its side edges and dividing the tank into two compartments, means to discharge sewage directly into one of said compartments near the opposite side edge of said partition, and a straight discharge pipe whose end is connected to the wall of the tank in the other compartment at a point near said other side edge of said partition wall below the scum line.

In testimony that I claim the foregoing as my invention, I have signed my name hereto.

WARREN H. BOOKER.

Copies of this patent may be obtained for five cents each, by addressing the "Commissioner of Patents, Washington, D. C."